United States Patent [19]

Marx

[11] Patent Number: 4,777,366

[45] Date of Patent: Oct. 11, 1988

[54] FUNCTION TESTING DEVICE FOR THERMOGRAPHIC APPARATUS

[75] Inventor: Dieter Marx, Aalen-Waldhausen, Fed. Rep. of Germany

[73] Assignee: Carl-Zeiss-Stiftung, Heidenheim on the Brenz, Fed. Rep. of Germany

[21] Appl. No.: 85,564

[22] Filed: Aug. 17, 1987

[30] Foreign Application Priority Data

Aug. 29, 1986 [DE] Fed. Rep. of Germany ....... 3629457

[51] Int. Cl.$^4$ .................... G02F 1/01; H01L 25/00; H01L 31/00
[52] U.S. Cl. .................................... 250/330; 250/332
[58] Field of Search .............. 250/330, 331, 332, 333, 250/334, 347, 352, 370, 230; 358/113; 356/43; 350/632, 636

[56] References Cited

U.S. PATENT DOCUMENTS 4,705,945 11/1987 Worcester ............................ 250/352

Primary Examiner—Eugene R. LaRoche
Assistant Examiner—David Mis
Attorney, Agent, or Firm—Stonebraker, Shepard & Stephens

[57] ABSTRACT

A mirror is mounted in front of the image screen of thermographic apparatus, for swinging movement from an out-of-the-way or ineffective position, to an effective operating position, lying across and perpendicular to the optical axis of the thermographic apparatus. In this operating position, the image on the image screen is reflected back to the image screen. Observation of the reflected back image on the image screen enables the observer to determine whether the thermographic apparatus is or is not functioning properly.

2 Claims, 1 Drawing Sheet

FUNCTION TESTING DEVICE FOR THERMOGRAPHIC APPARATUS

BACKGROUND OF THE INVENTION

This invention relates to a device for performing a function test on thermographic apparatus.

Thermographic apparatus serves to detect a target by responding to differences in the temperature of the target and the temperature of the surroundings of the target. Various forms of thermographic apparatus are known in the art, and the present invention may be used with various forms or kinds of such apparatus. An example of one form of thermographic apparatus with which the present invention may be used is the apparatus disclosed in Federal Republic of Germany Offenlegungsschrift No. 1,772,312 of H. Siebecker et al., filed Apr. 27, 1968 and published Dec. 10, 1970, and the corresponding British patent No. 1,242,162 of Eltro GmbH, filed Feb. 18, 1969 and published Aug. 11, 1971. The disclosures of these documents are incorporated herein by reference.

Known thermographic apparatus, such as the apparatus described in the above mentioned German and British documents, typically include an infrared (IR) optical system, a scanning prism, a row of detectors, and an evaluation electronic system which forwards the received signals to a row of light-emitting diodes arranged behind the row of detectors. The rays coming from the light-emitting diodes can be used to produce an IR image on an image screen.

For the military use of thermographic apparatus, it is necessary to have an easy way of checking the operation of the apparatus. When thermographic apparatus is placed in operation, a simple function test can be performed. From the IR picture produced, it can be noted whether the thermographic apparatus is operating properly. However, if the thermographic apparatus is installed on a vehicle such as an airplane or a tank which is located in an enclosure such as an airplane hangar or a shed, and if the thermographic apparatus on the vehicle is pointed at a relatively flat surface or "structureless" surface such as a door or a wall, then a satisfactory functional operational test can not be made in the conventional or normal way because a uniformly bright surface appears on the image screen, and it can not be noted from this image whether the thermographic apparatus is operating properly or not.

It is the object of the present invention to overcome this difficulty, and to provide a simple, effective, and inexpensive arrangement whereby a simple function test of the thermographic apparatus can be quickly made, to answer the question whether the apparatus is operating properly, yes or no, in all situations, including the situation described above where the thermographic apparatus is pointed toward a door or wall or other structureless surface.

SUMMARY OF THE INVENTION

In accordance with the invention, this object is achieved by providing, within the viewing range in front of the image screen of the thermographic apparatus, a pivoted mirror swingable about an axis, which can be swung from an out-of-the-way position to an effective position across the optical axis of the thermographic apparatus and perpendicular to such axis, with its reflecting surface faced toward the image screen of the thermographic apparatus.

This solution makes use of the socalled "Narcissus image" which is always produced when viewing, with a thermographic apparatus, a mirror surface which is perpendicular to the optical axis of the thermographic apparatus. In this case, the detector sees itself, i.e., the structure of the detector becomes visible in the thermographic image. In the normal operation of thermographic apparatus, this effect is undesired, but for purposes of a function test according to the present invention, this normally undesired effect is used to good advantage, since the detector structure appearing in the thermal image is clear proof that the thermographic apparatus is operating properly.

BRIEF DESCRIPTION OF THE DRAWINGS

One exemplary embodiment of the invention is illustrated in the accompanying drawing, in which.

DETAILED DESCRIPTION

Figure 1:
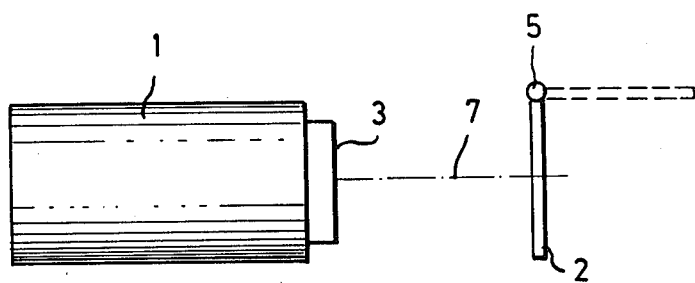
FIG. 1 is a schematic side elevational view of thermographic apparatus together with the pivoted mirror arrangement of the present invention.

Referring first to FIG. 1, any conventional thermographic apparatus is shown schematically at 1. This may be apparatus of the kind disclosed in the above mentioned British patent, or of any other known kind. The thermographic apparatus has an optical axis 7, and an image screen schematically indicated at 3.

Figure 2:
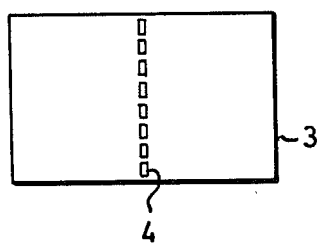
FIG. 2 is a view showing the detector structure in the thermographic image produced during the function test.

The mirror 2 is a swivel mirror hinged or pivoted at 5 so that it may be swung to the full line position where the reflecting surface extends across the optical axis 7 in a position perpendicular thereto. In this position, an image of the screen 3 is reflected back to the screen, producing a Narcissus image of the detector structure as indicated at 4 in FIG. 2. If observation shows the existence of this Narcissus image on the screen, this indicates that the thermographic apparatus is functioning properly.

When not in use to test the proper functioning of the thermographic apparatus, the mirror is swung up to the out-of-the-way position shown in broken lines.

What is claimed is:

1. A device for performing a function test on thermographic apparatus of the type having an optical axis and an image screen extending across said optical axis, said device comprising a pivoted mirror located in a visual range in front of said image screen and mounted to swing on an axis from an ineffective position in nonintersecting relation to said optical axis, to an effective operating position extending across said optical axis perpendicular thereto, said mirror when in said operating position having a reflecting surface faced toward said image screen and serving to reflect an image of said screen back to said screen.

2. The combination with thermographic apparatus having an optical axis and an image screen located on and extending transversely to said optical axis, of shiftable reflecting means mounted in front of said image screen, said reflecting means being shiftable from an out-of-the-way position to an effective operating position extending across said optical axis and positioned to reflect an image of said image screen back to said image screen, whereby the image reflected back to the image screen may be observed to ascertain whether said thermographic apparatus is or is not functioning properly.

* * * * *